United States Patent
Vantomme et al.

(10) Patent No.: US 11,193,006 B2
(45) Date of Patent: Dec. 7, 2021

(54) MONOVINLYAROMATIC POLYMERS COMPOSITIONS COMPRISING HIGH VISCOSITY METALLOCENE CATALYZED POLY-ALPHA-OLEFIN ADDITIVES

(71) Applicant: Total Research & Technology Feluy, Seneffe (BE)

(72) Inventors: Aurélien Vantomme, Mignault (BE); Serge Eon, Waterloo (BE); Vinciane Jonnieaux, Mornimont (BE); Armelle Sigwald, Nivelles (BE)

(73) Assignee: Total Research & Technology Feluy, Seneffe (BE)

( * ) Notice: Subject to any disclaimer, the term of this patent is extended or adjusted under 35 U.S.C. 154(b) by 147 days.

(21) Appl. No.: 16/330,450

(22) PCT Filed: Aug. 31, 2017

(86) PCT No.: PCT/EP2017/071819
§ 371 (c)(1),
(2) Date: Mar. 5, 2019

(87) PCT Pub. No.: WO2018/046379
PCT Pub. Date: Mar. 15, 2018

(65) Prior Publication Data
US 2020/0291207 A1    Sep. 17, 2020

(30) Foreign Application Priority Data
Sep. 6, 2016 (EP) ..................... 16187394

(51) Int. Cl.
*C08L 9/06* (2006.01)
*C08L 51/04* (2006.01)
*C08J 3/11* (2006.01)

(52) U.S. Cl.
CPC .............. *C08L 9/06* (2013.01); *C08L 51/04* (2013.01); *C08L 2205/03* (2013.01)

(58) Field of Classification Search
CPC ................................. C08L 9/06; C08L 51/04
See application file for complete search history.

(56) References Cited

U.S. PATENT DOCUMENTS

| 2003/0105241 A1 | 6/2003 | Reddy et al. |
| 2004/0001962 A1 | 1/2004 | Reddy et al. |
| 2010/0197863 A1* | 8/2010 | Bouquet ................ C08L 25/06 525/233 |

FOREIGN PATENT DOCUMENTS

| CN | 102977537 A | 3/2013 |
| CN | 103819865 A | 5/2014 |
| WO | 0214384 A2 | 2/2002 |
| WO | 2010033489 A1 | 3/2010 |

OTHER PUBLICATIONS

International Search Report issued in Application No. PCT/EP2017/071819, dated Oct. 25, 2017, 4 pages.

* cited by examiner

*Primary Examiner* — Tae H Yoon
(74) *Attorney, Agent, or Firm* — Albert Shung

(57) ABSTRACT

The invention relates to a composition comprising a rubber-modified monovinylaromatic polymer comprising:
  70 wt % or more of a monovinylaromatic polymer matrix,
  from 2 to 12 wt % of at least one rubber, and
  from 0.1 to 3.4 wt % of metallocene-catalyzed poly-alpha-olefins (mPAO)
all based on the total weight of the rubber-modified monovinylaromatic polymer, with the mPAO having a kinematic viscosity of at least 950 mm$^2$/s at 40° C. and at most 2,000 mm$^2$/s at 40° C. as measured according to ISO 3104. The invention also relates to articles made from such composition and to the process to produce said composition and said articles.

12 Claims, 1 Drawing Sheet

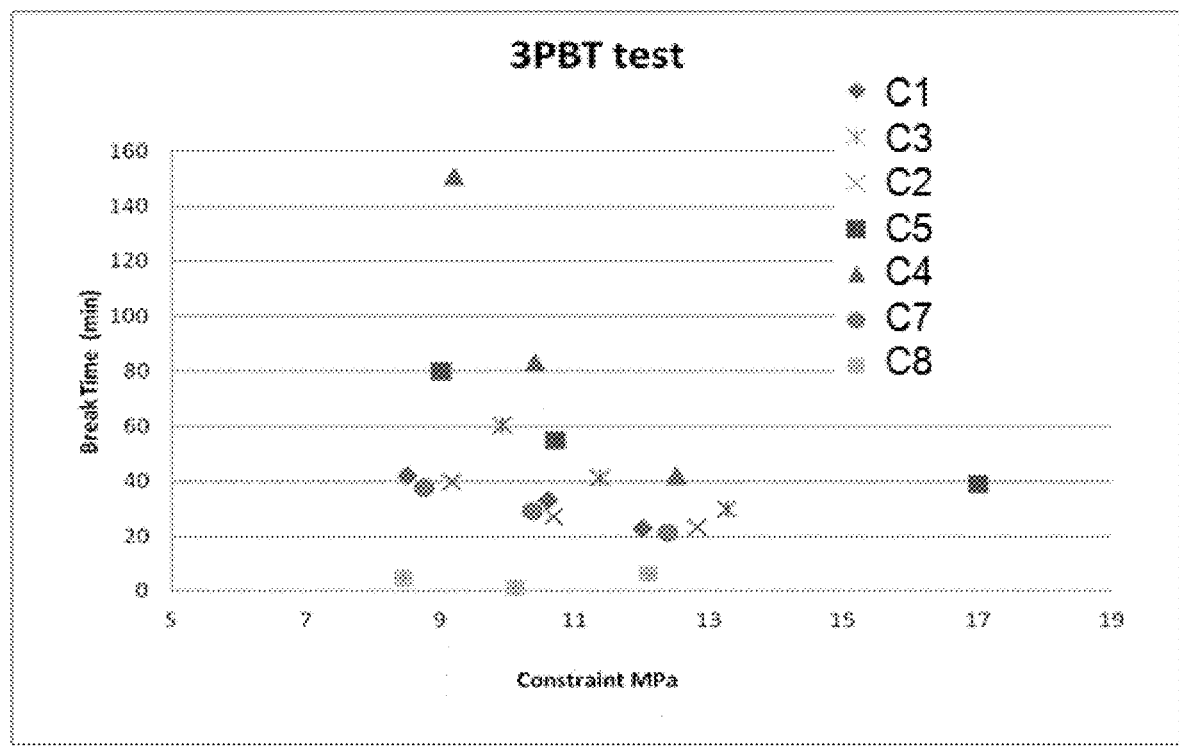

MONOVINLYAROMATIC POLYMERS COMPOSITIONS COMPRISING HIGH VISCOSITY METALLOCENE CATALYZED POLY-ALPHA-OLEFIN ADDITIVES

CROSS-REFERENCE TO RELATED APPLICATIONS

This application claims the benefit of PCT/EP2017/071819 filed Aug. 31, 2017, which claims priority from EP 16187394.8 filed Sep. 6, 2016, which are incorporated herein by reference in their entireties for all purposes.

FIELD OF THE INVENTION

The invention relates to rubber-modified monovinylaromatic polymers compositions, such as high impact polystyrene (HIPS) compositions, with improved performances in stress crack properties, and to the process for producing such compositions. The invention also relates to articles made thereof.

BACKGROUND OF THE INVENTION

Thermoformed articles such as food containers made from high impact (i.e. rubber-modified polystyrene (HIPS), a common rubber-modified monovinylaromatic polymer) are prone to stress cracking when they come into contact with fats and oils found in organic food products. Articles made from HIPS are also subject to stress cracking when coming into contact with organic blowing agents such as halohydrocarbons, containing fluorine and chlorine. These polymers generally are found in household items such as refrigerator liners, which may crack when the cavities in the refrigerators are filled with polyurethane foam as a result of the blowing agent utilized in the foam.

Various approaches have been made to provide rubber reinforced monovinylaromatic polymers having good resistance to environmental stress cracking (i.e. good ESCR). These include the use of multi-layer sheet technology, increasing the amount of rubber, increasing the gel phase volume, optimizing the rubber particle size, controlling the amount of cross linking of the rubber, optimizing the process, the use of additives such as polypropylene, polybutylene, and ethylene/α-olefin copolymers, and the use of high molecular weight rubber.

Some years ago, it was found that the addition of 1 to 3 wt % polyisobutene (PIB) in HIPS was boosting ESCR properties. However, the constant research towards an upgrade of the stress crack properties has turned the attention towards other oligomers.

US2004/0001962 teaches the use of polyisobutylene, certain polymerized alpha-olefins (PAO) of at least 10 carbon atoms, atactic polypropylene, or a polyolefin copolymer with optional use of mineral oil in HIPS in order to enhance the ESCR. The dynamic viscosity of the selected PAO is high and ranges from 100 to 500 centipoise (cP) (100 to 500 mm$^2$/s) or 200 to 1000 cP (200 to 1000 mm$^2$/s) at 99° C. as determined by ASTM D-3236. However, in the examples, the PAO used is VYBAR® 825. According to WO2010033489, VYBAR® 825 shows a dynamic viscosity of 54 cP (54 mm$^2$/s) at 98.9° C. and of 530 cP (530 mm$^2$/s) at 37.8° C. (ASTM D-3236).

WO2010033489 discloses compositions comprising a rubber-modified monovinylidene aromatic polymers and an effective amounts of polymerized alpha-olefins (PAO) having a dynamic viscosity (ASTM D-3236) of from about 40 to about 500 cP (about 40 to about 500 mm$^2$/s) at 40 ° C. The examples disclose the use of metallocene-catalyzed PAO (mPAO) in an amount of 3.5 wt % of the final polymer composition. It was found that ESCR was improved for compositions comprising mPAO having a kinematic viscosity ranging from 65 mm$^2$/s (Durasyn® 170) to 400 mm$^2$/s (Durasyn® 174) at 40° C. Higher viscosities mPAO, such as mPAO having a kinematic viscosity above 1000 mm$^2$/s (Durasyn® 180) at 40° C., were found less efficient.

It is reminded here that the dynamic viscosity of a fluid express its resistance to shearing flows, where adjacent layers move parallel to each other at different speeds; and that the kinematic viscosity is the ratio of the dynamic viscosity to the density of the fluid.

There is a continuous interest to find solutions to upgrade the ESCR performance and overall property combinations of HIPS and similar materials that do not reduce the degrees of freedom within the process of making and moulding the polymer, or reduce the qualities of the polymer itself.

There is an interest to find solutions to enhance the ESCR of rubber-modified monovinylaromatic polymers which can be cost effective for example in that additive content is kept as low as possible.

Thus, an object of the invention is to provide rubber-modified monovinylaromatic polymers compositions with improved stress crack resistance properties.

SUMMARY OF THE INVENTION

According to a first aspect, the invention provides a composition comprising a rubber-modified monovinylaromatic polymer comprising:
  70 wt % or more of a monovinylaromatic polymer matrix, based on the total weight of the rubber-modified monovinylaromatic polymer,
  from 2 to 12 wt % of at least one rubber, based on the total weight of the rubber-modified monovinylaromatic polymer, and
  from 0.1 to 3.4 wt % of metallocene-catalyzed poly-alpha-olefins (mPAO) based on the total weight of the rubber-modified monovinylaromatic polymer, with the mPAO having a kinematic viscosity of at least 950 mm$^2$/s at 40° C. and at most 2,000 mm$^2$/s at 40° C. as measured according to ISO 3104.

Surprisingly, it has been found by the inventors that high viscosity mPAO, even at low concentrations (such as below 3.4 wt % of the rubber-modified monovinylaromatic polymer), lead to improved ESCR properties while lower viscosities mPAO are less efficient.

With preference, one or more of the following features can be used to further define the inventive composition:
  The rubber-modified monovinylaromatic polymer is a rubber-modified monovinylaromatic homopolymer or a rubber-modified monovinylaromatic copolymer.
  The mPAO is present in an amount of at least 0.3 wt % based on the total weight of the rubber-modified monovinylaromatic polymer, preferably of at least 0.4 wt %, preferably of at least 0.8 wt %, preferably of at least 1.0 wt %, more preferably of at least 1.1 wt %.
  The mPAO is present in an amount of at most 3.3 wt % based on the total weight of the rubber-modified monovinylaromatic polymer, preferably at most 3.2 wt %, preferably at most 3.0 wt %, preferably at most 2.8 wt %, preferably at most 2.5 wt %, more preferably at most 2.0 wt %, even more preferably at most 1.8 wt %, and most preferably at most 1.5 wt %.

The kinematic viscosity of the mPAO is at least 1,000 mm$^2$/s at 40° C. and preferably of at least 1,100 mm$^2$/s at 40° C. as measured according to ISO 3104.

The kinematic viscosity of the mPAO is at most 1,800 mm$^2$/s at 40° C., preferably at most 1,500 mm$^2$/s at 40° C. and more preferably of at most 1,400 mm$^2$/s at 40° C. as measured according to ISO 3104.

The kinematic viscosity of the mPAO is at least 100 mm$^2$/s at 100° C., preferably at least 110 mm$^2$/s at 100° C. and/or the kinematic viscosity of the mPAO is at most 200 mm$^2$/s at 100° C. and preferably at most 190 mm$^2$/s at 100° C. as measured according to ISO 3104.

The viscosity index of the mPAO is at least 200 as determined according to ISO 2909.

The mPAO has a pour point of less than −20° C., preferably less than −25° C., more preferably less than −30° C. and most preferably less than −35° C. as determined by ISO 3016.

The mPAO being made from alpha-olefins having at least 6 carbons atoms and at most 20 carbon atoms.

The mPAO is an oligomer based on one or more of the alpha-olefin monomers selected from the group comprising hexene, octene, decene, dodecene and tetradecene.

The composition further comprises a plasticizer, being preferably a mineral oil and/or polyisobutene, in amounts ranging from 0.1 to 6 wt % of the composition, preferably from 0.5 wt % to 3.5 wt %, more preferably 1.5 to 3.0 wt %.

The composition further comprises a plasticizer, being a mineral oil and having a kinematic viscosity at 40° C. ranging from 65 to 100 mm$^2$/s according to ISO 3104, preferably ranging from 65 to 75 mm$^2$/s.

The weight ratio of the plasticizer to the mPAO in the composition is at most 1:50, preferably at most 1:10, more preferably at most 1:4, even more preferably at most 1:0.75.

The weight ratio of the plasticizer to the mPAO in the composition is at least 1:0.02, preferably at least 1:0.2.

The rubber-modified monovinylaromatic polymer is a rubber-modified polystyrene (HIPS) or a rubber-modified poly(styrene-acrylonitrile) (ABS).

The rubber-modified monovinylaromatic polymer comprises from 2 to 8 wt % of one or more rubber, based on the total weight of the rubber-modified monovinylaromatic polymer.

The rubber-modified monovinylaromatic polymer comprises a rubber selected from the group consisting of polybutadiene, polyisoprene, copolymers of butadiene and/or isoprene with styrene, and natural rubber.

The weight average molecular weight (Mw) of the monovinylaromatic polymer matrix is at least 130,000 g/mol, preferably at least 140,000 g/mol, and more preferably at least 150,000 g/mol as determined by gel permeation chromatography.

The molecular weight distribution of the monovinylaromatic polymer matrix is at least 1.8, preferably at least 2.1.

The molecular weight distribution of the monovinylaromatic polymer matrix is at most 5.0, more preferably at most 4.0, and most preferably at most 3.5.

According to a second aspect, the invention provides a process for preparing a composition comprising a rubber-modified monovinylaromatic polymer as defined according to the first aspect of the invention, said process comprising the step of polymerizing a reaction mixture of monovinylaromatic monomer, one or more rubber and one or more metallocene-catalyzed poly-alpha olefins (mPAO), wherein the one or more mPAO is present in an amount of from 0.1 to 3.4 wt % based on the total weight of the mixture.

Preferably, the process of the invention comprises the following steps:
a) feeding a reaction mixture comprising at least one monovinyl aromatic monomer, at least one rubber, at least one mPAO having a kinematic viscosity of at least 950 mm$^2$/s at 40° C. and at most 2,000 mm$^2$/s at 40° C. as measured according to ISO 3104, and an optional free radical initiator to a phase-inversion reactor and polymerizing the reaction mixture in the phase-inversion reactor to above the inversion point of the reaction mixture to produce a first polymerization mixture comprising at least the rubber and the mPAO;
b) feeding the first polymerization mixture to a polymerization reactor to produce a second polymerization mixture;
c) optionally feeding the second polymerization mixture into at least one subsequent reactor for post-inversion polymerization of the third polymerization mixture, further wherein the reaction mixture comprises at least one monovinylaromatic monomer, at least one rubber and at least one mPAO in proportions effective to produce a rubber-modified monovinylaromatic polymer comprising:
70 wt % or more of a monovinylaromatic polymer matrix, based on the total weight of the rubber-modified monovinylaromatic polymer,
from 2 to 12 wt % of at least one rubber, based on the total weight of the rubber-modified monovinylaromatic polymer, and
from 0.1 to 3.4 wt % of metallocene-catalyzed poly-alpha-olefins (mPAO) based on the total weight of the rubber-modified monovinylaromatic polymer.

Preferably step a) is performed in two or more stages comprising:
a1) feeding a reaction mixture comprising at least one monovinyl aromatic monomer, at least one rubber, at least one mPAO and an optional free radical initiator to a pre-inversion reactor, and polymerizing the reaction mixture in the reactor to a point below the inversion point of the reaction mixture to produce a pre-polymerization mixture;
a2) feeding the pre-polymerization mixture to a phase-inversion reactor and polymerizing the pre-polymerization mixture to above the inversion point of the pre-polymerization mixture to produce a first polymerization mixture.

With preference, one or more of the following features can be used to further define the inventive process according to the second aspect of the invention or its embodiments:
The mPAO is admixed with the rubber and the monovinylaromatic monomer, to form the rubber-modified monovinylaromatic polymer.
The mPAO is added prior to the initiation of the polymerization or at the beginning of the polymerization.
Before the post-inversion polymerization, the polymerization reaction takes place in two or more serially connected reactors.

According to a third aspect, the invention provides an article comprising the composition as defined according to the first aspect of the invention and/or the composition prepared according to the second aspect of the invention.

Preferably the article is selected from films, fibres, sheet structures, moulded objects, automobile parts, hoses, refrigerator and other liners, clothing and footwear components and gaskets, more preferably the article is selected from refrigerator liners and automobile parts.

According to a fourth aspect, the invention provides a process for producing an article according to the third aspect of the invention, said process including:
- a step of extruding and/or thermoforming an article, or
- a step of injecting an article, using the composition as defined according to the first aspect of the invention and/or the composition prepared according to the second aspect of the invention.

DESCRIPTION OF THE FIGURES

FIG. 1 provides the results of the 3PBT test on inventive and comparative compositions.

DETAILED DESCRIPTION OF THE INVENTION

For the purpose of the invention the following definitions are given:

As used herein, a "polymer" is a polymeric compound prepared by polymerizing monomers, whether of the same or a different type. The generic term polymer thus embraces the term homopolymer, usually employed to refer to polymers prepared from only one type of monomer, and the terms copolymer and interpolymer as defined below.

As used herein, a "copolymer", "interpolymer" and like terms mean a polymer prepared by the polymerization of at least two different types of monomers. These generic terms include polymers prepared from two or more different types of monomers, i.e. terpolymers, tetrapolymers, etc.

As used herein, "blend", "polymer blend" and like terms refer to a composition of two or more compounds, typically two or more polymers. As used herein, "blend" and "polymer blend" also include "reactor blends," such as where a monomer is polymerized in the presence of a polymer. For example, the blend may initially be a blend of a first polymer and one or more monomers which are then polymerized to form a second polymer. A blend may or may not be miscible. A blend may or may not be phase separated. A blend may or may not contain one or more domain configurations, as determined from transmission electron spectroscopy, light scattering, x-ray scattering, or any other method known in the art. Preferred blends (i.e. preferred reactor blends) include two or more phases. For example, the blend may include a first phase including some or all of the monovinylaromatic polymer and a second phase including some or all of the rubber and of the mPAO.

As used herein, "composition" and like terms mean a mixture or blend of two or more components. The composition of this invention is the rubber-modified monovinylaromatic polymer including the poly-alpha-olefin. The composition may include other components, polymeric or non-polymeric (i.e., additives), necessary or desirable to the end use of the composition.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the terms "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the recited end point values themselves (e.g. from 1.0 to 5.0 includes both 1.0 and 5.0). Any numerical range recited herein is intended to include all sub-ranges subsumed therein.

The particular features, structures, characteristics or embodiments may be combined in any suitable manner, as would be apparent to a person skilled in the art from this disclosure, in one or more embodiments The Composition The invention provides a composition comprising a rubber-modified monovinylaromatic polymer comprising:
- 70 wt % or more of a monovinylaromatic polymer matrix, based on the total weight of the rubber-modified monovinylaromatic polymer,
- from 2 to 12 wt % of at least one rubber, based on the total weight of the rubber-modified monovinylaromatic polymer, and
- from 0.1 to 3.4 wt % of metallocene-catalyzed poly-alpha-olefins (mPAO) based on the total weight of the rubber-modified monovinylaromatic polymer, with the mPAO having a kinematic viscosity of at least 950 $mm^2/s$ at 40° C. and at most 2,000 $mm^2/s$ at 40° C. as measured according to ISO 3104.

The Monovinylaromatic Polymer Matrix

Monovinylaromatic polymers (i.e. homopolymers and copolymers) are produced by polymerizing monovinylaromatic monomers i.e. any aromatic having a vinyl function. By way of example monovinylaromatic monomers are one or more from styrene, vinyl toluene, alphamethylstyrene, alphaethylstyrene, methyl-4-styrene, methyl-3-styrene, methoxy-4-styrene, hydroxymethyl-2-styrene, ethyl-4-styrene, ethoxy-4-styrene, dimethyl-3,4-styrene, chloro-2-styrene, chloro-3-styrene, chloro-4-methyl-3-styrene, tert-butyl-3-styrene, dichloro-2,4-styrene, dichloro-2,6-styrene, vinyl-1-naphtalene and vinylanthracene. It would not depart from the scope of the invention to use more than one monovinylaromatic monomer. Preferably, the monovinylaromatic monomer includes or consists of styrene.

The monovinylaromatic polymer is the monovinylaromatic polymer matrix in the rubber-modified monovinylaromatic polymer. The concentration of the monovinylaromatic monomers (i.e. the concentration of styrene) preferably is about 60 wt % or more, more preferably about 65 wt % or more, even more preferably about 70 wt % or more, even more preferably about 80 wt % or more, even more preferably about 90 wt % or more, and most preferably about 93 wt % or more, based on the total weight of the rubber-modified monovinylaromatic polymer.

The monovinylaromatic monomer can be copolymerized with one or more of a range of other copolymerizable monomers. Preferred comonomers include nitrite monomers such as acrylonitrile, methacrylonitrile and fumaronitrile; (meth)acrylate monomers such as methyl methacrylate or n-butyl acrylate; maleic anhydride and/or n-aryl maleimides such as n-phenyl maleimide, and conjugated and nonconjugated dienes and alkyl esters of acrylic or methacrylic acid. Representative copolymers include styrene-acrylonitrile (SAN) copolymers.

The copolymers typically include the comonomer at a concentration of 0.1 wt % or more, preferably 1 wt % or more, even more preferably 2 wt % or more, and most preferably 5 wt % or more, based on weight of the copolymer. Typically, the copolymer includes the copolymer at a concentration of 40 wt % or less, preferably 35 wt % or less, and most preferably 30 wt % or less, based on the weight of the copolymer.

In a preferred embodiment, the rubber modified monovinylaromatic polymer is a rubber-modified polystyrene (HIPS) or a rubber-modified poly(styrene-acrylonitrile) (ABS). More preferably, the rubber modified monovinylaromatic polymer is a rubber-modified polystyrene (HIPS).

The molecular weight of the monovinylaromatic polymer may be characterized by the number average molecular weight (Mn), the weight average molecular weight (Mw), the z-average molecular weight (Mz), the molecular weight distribution (Mw/Mn), or any combination thereof.

The molecular weight of the monovinylaromatic polymer influences its mechanical strength. In the invention, the molecular weight should be sufficiently high so that the composition has good resistance to environmental stress cracking, despite having a low concentration of the rubber (i.e. at most 12 wt % based on the total weight of the rubber-modified monovinylaromatic polymer) and/or a generally high concentration of monovinylaromatic polymer (i.e. at least 70 wt % based on the total weight of the rubber-modified monovinylaromatic polymer).

In an embodiment, the weight average molecular weight (Mw) of the monovinylaromatic polymer is at least 130,000 g/mol, preferably at least 140,000 g/mol, and more preferably at least 150,000 g/mol as determined by gel permeation chromatography. The weight average molecular weight of the monovinylaromatic polymer should be sufficiently low so that the material can be easily produced and/or processed. The weight average molecular weight of the monovinylaromatic polymer may be preferably at most 300,000 g/mol, more preferably at most 280,000 g/mol, even more preferably of at most 260,000 g/mol, and most preferably of at most 240,000 g/mol.

The molecular weight distribution (Mw/Mn) of the monovinylaromatic polymer is preferably at least 1.8, more preferably at least 2.0, even more preferably at least 2.1. The molecular weight distribution of the monovinylaromatic polymer preferably is at most 4.0, more preferably at most 3.5, even more preferably at most 3.0 and most preferably at most 2.5.

The monovinylaromatic polymer preferably has a z-average molecular weight (Mz) of at least 250,000 g/mol. The monovinylaromatic polymer preferably has a z-average molecular weight of at most 1,000,000 g/mol.

The rubber-modified monovinylaromatic polymer comprises 70 wt % or more of a monovinylaromatic polymer matrix, based on the total weight of the rubber-modified monovinylaromatic polymer and one or more rubber, preferably 80 wt % or more of a monovinylaromatic polymer matrix, more preferably 90 wt % or more of a monovinylaromatic polymer matrix.

The Rubber Component

The monovinylaromatic polymer contains at least one rubber (e.g. elastomeric polymer) dispersed as rubber particles in the monovinylaromatic matrix. The rubber may be any rubber suitable for improving the impact resistance and/or the resistance to environmental stress cracking when present in a monovinylaromatic polymer. The rubber preferably is an unsaturated rubbery polymer or other polymers capable of forming a graft copolymer during the polymerization of the monovinylaromatic polymer.

Exemplary rubbers include, but are not limited to ethylene-propylene rubber (EPR), ethylene-propylene-diene rubber (EPDM), polybutadiene, acrylonitrile-butadiene copolymer, polyisoprene, isoprene-acrylonitrile copolymer, styrene butadiene rubber (SBR), and copolymers having styrene blocks and natural rubber. More particularly the copolymers having styrene blocks are advantageously copolymers with styrene blocks and blocks made of butadiene or isoprene or of a mixture butadiene /isoprene. These block copolymers can be linear block copolymers or star block copolymers, hydrogenated and/or functionalized. Preferably the rubber is selected from polybutadiene, polyisoprene, copolymers of butadiene and/or isoprene with styrene, and natural rubber.

The rubber in the rubber-modified polymers of the invention is typically present in an amount of at most 15 wt % based on the total weight of the rubber-modified monovinylaromatic polymer, preferably of at most 12 wt %, more preferably of at most 10 wt %, even more preferably of at most 8 wt %. In general, the rubber is present in an amount of at least 2 wt % based on the total weight of the rubber-modified monovinylaromatic polymer, preferably of at least 3 wt %, more preferably of at least 4 wt % and even more preferably of at least 5 wt %. Typically, HIPS products contain less rubber than ABS products.

The rubber particles in the compositions according to the present invention, in order to provide sufficient initial toughness and sufficient ESCR, will typically have a volume median diameter D50(v) of at least 1 micrometers ("μm"), preferably at least 2 μm, and most preferably at least 3 μm and typically at most 12 μm, preferably at most 10 μm, even more preferably of at most 9 μm, preferably at most 8 μm.

Metallocene-Catalyzed Poly-Alpha-Olefins (mPAO) Component

The rubber-modified monovinyl aromatic polymer further comprises at least one mPAO in a dispersed phase.

The metallocene-catalyzed poly-alpha-olefins (mPAO) suitable for the invention are low molecular weight polymers (also referred to as "oligomers") made from alpha-olefins having from at least 6 carbons up to about 20 carbons and can be homopolymers or copolymers of two or more of these monomeric units provided that the polymer composition will meet the mPAO specifications as prescribed below. Typical mPAO suitable for use according to the present invention comprise monomeric units (i.e. monomers), having at least 6, preferably at least 8, more preferably at least 10 carbon atoms, and a maximum of 20 carbon atoms, preferably 18, more preferably 16, and most preferably a maximum of 14 carbon atoms.

In an embodiment, the mPAO include but are not limited to oligomers of one or more of the monomers hexene, octene, decene, dodecene and tetradecene, including especially the "co-oligomers" that are prepared from the mixtures of two or more of these monomers, which monomer mixtures are often produced in the monomer production processes. These mPAO products are commercially available. In accordance to the invention, blends of two or more mPAO can also be used. However, if the mPAO is a blend of two or more mPAO of different viscosity values and/or viscosity index, then the blend will need to have viscosity values and/or viscosity index within the prescribed ranges. Where combinations or blends of the mPAO are used, they can be blended together by any pre-reactor, in-reactor or post-reactor process.

According to the invention, the PAO used are metallocene-catalyzed (i.e. mPAO). The metallocene catalysts are compounds of Group IV transition metals of the Periodic Table such as titanium, zirconium, hafnium, etc., and have a coordinated structure with a metal compound and ligand composed of one or two groups of cyclopentadienyl, indenyl, fluorenyl or their derivatives. Metallocenes comprise a single metal site, which allows for more control of branching and molecular weight distribution of the oligomers.

Metallocene components used to prepare suitable mPAO can be simple metallocenes, substituted metallocenes or bridged metallocene catalysts activated or promoted by, for instance, methylaluminoxane (MAO) or a non-coordinating anion, such as N,N-dimethylanilinium tetrakis(perfluorophenyl)borate or other equivalent anion and optionally with co-activators, typically trialkylaluminum compounds. Supporting method and polymerisation processes are described in many patents, and for example in WO02/14384.

The metallocene component may be supported according to any method known in the art. In the event it is supported, the support used in the present invention can be any organic or inorganic solid, particularly porous support such as silica, talc, inorganic oxides, and resinous support material such as polyolefin. Preferably, the support material is an inorganic oxide in its finely divided form.

The use of metallocene-catalyzed PAO (mPAO) in accordance to the invention has several advantages over conventional PAO. One of the advantages is found in the structure of the PAO in itself. Indeed, whereas conventional PAO will show a random distribution of short and long side chains, mPAO will show a uniform, comb-like structure with absence of short side chains. This structure of the mPAO plays a role in the properties they show. For instance, mPAO usually shows a higher viscosity index than conventional PAO, mineral oils and PIB. High viscosity index offers better protection at high temperature and better fluidity at low temperature. Also, mPAO usually shows a lower pour point than PAO, mineral oils and PIB, which is of interest in low temperature applications. mPAO structure is also expected to provide better final product consistency than what would be obtained with PAO.

In accordance with the invention, the rubber-modified monovinylaromatic polymer comprises from 0.1 to 3.4 wt % of mPAO, as based on the total weight of the rubber-modified monovinylaromatic polymer, having a kinematic viscosity of at least 950 mm$^2$/s at 40° C. as measured according to ISO 3104.

Surprisingly, it has been found that the addition of high viscosity mPAO in a rubber-modified monovinylaromatic polymer enhances the ESCR of the composition whereas lower viscosities mPAO were found less efficient. It has also been found that this enhancement of the ESCR can be achieved at low concentrations of mPAO.

In a preferred embodiment, the mPAO is present in an amount of at least 0.3 wt % based on the total weight of the rubber-modified monovinylaromatic polymer, preferably of at least 0.4 wt %, more preferably of at least 0.8 wt %, even more preferably of at least 1.0 wt %, and most preferably of at least 1.1 wt %.

In another embodiment, the mPAO is present in an amount of at most 3.3 wt % based on the total weight of the rubber-modified monovinylaromatic polymer, preferably of at most 3.2 wt % preferably of at most 3.0 wt % preferably of at most 2.8 wt % preferably of at most 2.5 wt %, more preferably of at most 2.0 wt %, even more preferably of at most 1.8 wt % and most preferably of at most 1.5 wt %.

In a preferred embodiment of the invention, the kinematic viscosity of the mPAO is at least 1,000 mm$^2$/s at 40° C. and preferably of at least 1,100 mm$^2$/s at 40° C. as measured according to ISO 3104. Preferably, the kinematic viscosity of the mPAO is at most 1,800 mm$^2$/s at 40° C., preferably at most 1,500 mm$^2$/s at 40° C. and more preferably of at most 1,400 mm$^2$/s at 40° C. as measured according to ISO 3104.

In another preferred embodiment, the kinematic viscosity of the mPAO is at least 100 mm$^2$/s at 100° C., preferably at least 110 mm$^2$/s at 100° C. and/or the kinematic viscosity of the mPAO is at most 200 mm$^2$/s at 100° C. and preferably at most 190 mm$^2$/s at 100° C. as measured according to ISO 3104.

In a preferred embodiment of the invention, the mPAO shows a viscosity index of at least 200 as determined according to ISO 2909.

The mPAO of the invention have a pour point of less than −20° C., preferably less than −25° C., more preferably less than −30° C. and most preferably less than −35° C. as determined by ISO 3016.

Further Additives to the Composition

The compositions of the invention can further comprise one or more fillers and/or additives as long as they do not detrimentally affect the desired property combinations that are otherwise obtained or, preferably, they would improve one or more of the properties.

For example, plasticizers (preferably mineral oil and/or polyisobutene) are one of the additives that may improve the ESCR of HIPS or of other rubber-modified monovinylaromatic polymers such as ABS. These materials are added in known amounts using conventional equipment and techniques. Other representative fillers include talc, calcium carbonate, organo-clay, glass fibres, marble dust, cement dust, feldspar, silica or glass, fumed silica, silicates, alumina, various phosphorus compounds, ammonium bromide, antimony trioxide, zinc oxide, zinc borate, barium sulfate, silicones, aluminum silicate, calcium silicate, titanium oxides, glass micro spheres, chalk, mica, clays, wollastonite, ammonium octamolybdate, intumescent compounds, expandable graphite, and mixtures of two or more of these materials. The fillers may carry or contain various surface coatings or treatments, such as silanes, fatty acids, and the like.

In an embodiment, the composition includes a plasticizer, preferably being mineral oil and/or polyisobutene. Preferably, the concentration of the plasticizer (i.e. the concentration of the mineral oil and/or polyisobutene) is greater than 0.1 wt %, preferably at least 0.5 wt %, more preferably at least 0.8 wt %, preferably at least 1.0 wt %, preferably at least 1.5 wt % and most preferably at least 2.0 wt %, based on the total weight of the composition. The concentration of the plasticizer (i.e. the concentration of the mineral oil and/or polyisobutene), if employed, is preferably at most 6 wt %, more preferably at most 5 wt %, even more preferably at most 4 wt %, even more preferably at most 3.5 wt %, and most preferably at most 3.0 wt %, based on the total weight of the composition.

Mineral oils have typical kinematic viscosity at 40° C. in between 65 and 100 mm$^2$/s, preferably around 70 mm$^2$/s, as determined according to ISO 3104. In an embodiment, the weight ratio of the plasticizer to the mPAO in the composition is at most 1:1, preferably at most 1:0.75.

In an embodiment, the weight ratio of the plasticizer to the mPAO in the composition is at most 1:50, preferably at most 1:10, more preferably at most 1:4, even more preferably at most 1:0.75.

In another embodiment, the weight ratio of the plasticizer to the mPAO in the composition is at least 1:0.1, preferably at least 1:0.2.

Still other additives include flame retardants such as the halogenated organic compounds. The composition can also contain additives such as, for example, antioxidants (i.e., hindered phenols such as, for example, IRGANOX™1076), mould release agents, processing aids other than mineral oil (such as other oils, organic acids such as stearic acid, metal salts of organic acids), colorants or pigments to the extent that they do not interfere with desired physical or mechanical properties of the compositions of the present invention.

The compositions of this invention can comprise polymers other than the monovinylaromatic polymers and the mPAO. Representative other polymers include, but are not limited to ethylene polymer (i.e. low density polyethylene (LDPE), ultra-low density polyethylene (ULDPE), medium density polyethylene (MDPE), linear low density polyethylene (LLDPE), high density polyethylene (HDPE), homogeneously branched linear ethylene polymer, substantially linear ethylene polymer, graft-modified ethylene polymers, ethylene vinyl acetate interpolymer, ethylene acrylic acid interpolymer, ethylene ethyl acetate interpolymer, ethylene methacrylic acid interpolymer, ethylene methacrylic acid ionomer, and the like), conventional polypropylene (i.e. homopolymer polypropylene, polypropylene copolymer, random block polypropylene interpolymer and the like), polyether block copolymer (i.e. PEBAX), polyphenylene ether, copolyester polymer, polyester/polyether block polymer (i.e. HYTEL), ethylene carbon monoxide interpolymer (i.e., ethylene/carbon monoxide (ECO), copolymer, ethylene/acrylic acid/carbon monoxide (EAACO) terpolymer, ethylene/methacrylic acid/carbon monoxide (EMAACO) terpolymer, ethylene/vinyl acetate/carbon monoxide (EVACO) terpolymer and styrene/carbon monoxide (SCO)), polyethylene terephthalate (PET), chlorinated polyethylene, styrene-butadiene-styrene (SBS) interpolymer, styrene-ethylene-butadiene-styrene (SEBS) interpolymer, and the like and mixtures of two or more of these other polymers. The polyolefins that can comprise one or more of the other polymers include both high and low molecular weight polyolefins, and saturated and unsaturated polyolefins.

If the composition comprises one or more other polymers, then the other polymers typically are present in an amount of no more than 20 wt % of the total weight of the composition, preferably no more than 15 wt %, more preferably no more than 10 wt %, more preferably no more than 5 wt %, and most preferably no more than 2 wt % of the total weight of the composition.

Process to Prepare the Composition

The invention provides a process for preparing a composition comprising a rubber-modified monovinylaromatic polymer, said process comprising the step of polymerizing a reaction mixture of monovinylaromatic monomer, one or more rubber and one or more metallocene-catalyzed poly-alpha olefins (mPAO), wherein the one or more mPAO is present in an amount of from 0.1 to 3.4 wt % based on the total weight of the mixture.

The mPAO can be combined or blended into the monovinylaromatic polymer by any pre-reactor, in-reactor or post-reactor mixing or blending process.

In one embodiment of the present invention, the mPAO component(s) as specified above are added as a liquid into the monovinylaromatic polymer polymerization process, preferably to the monomer solution, to the dissolved rubber feed solution or elsewhere during or prior to initiation of the polymerization reaction. Preferably, the mPAO is added prior to the initiation of the polymerization reaction.

Thus in an embodiment, the process of the invention comprises the following steps:
 a) feeding a reaction mixture comprising at least one monovinyl aromatic monomer, at least one rubber, at least one mPAO having a kinematic viscosity of at least 950 mm²/s at 40° C. and at most 2,000 mm²/s at 40° C. as measured according to ISO 3104, and an optional free radical initiator to a phase-inversion reactor and polymerizing the reaction mixture in the phase-inversion reactor to above the inversion point of the reaction mixture to produce a first polymerization mixture comprising at least the rubber and the mPAO;
 b) feeding the first polymerization mixture to a polymerization reactor to produce a second polymerization mixture;
 c) optionally feeding the second polymerization mixture into at least one subsequent reactor for post-inversion polymerization of the third polymerization mixture, further wherein the reaction mixture comprises at least one monovinylaromatic monomer, at least one rubber and at least one mPAO in proportions effective to produce a rubber-modified monovinylaromatic polymer comprising:
 70 wt % or more of a monovinylaromatic polymer matrix, based on the total weight of the rubber-modified monovinylaromatic polymer,
 from 2 to 12 wt % of at least one rubber, based on the total weight of the rubber-modified monovinylaromatic polymer, and
 from 0.1 to 3.4 wt % of metallocene-catalyzed poly-alpha-olefins (mPAO) based on the total weight of the rubber-modified monovinylaromatic polymer.

In an embodiment step a) is performed in two or more stages comprising:
 a1) feeding a reaction mixture comprising at least one monovinyl aromatic monomer, at least one rubber, at least one mPAO and an optional free radical initiator to a pre-inversion reactor, and polymerizing the reaction mixture in the reactor to a point below the inversion point of the reaction mixture to produce a pre-polymerization mixture;
 a2) feeding the pre-polymerization mixture to a phase-inversion reactor and polymerizing the pre-polymerization mixture to above the inversion point of the pre-polymerization mixture to produce a first polymerization mixture.

In an embodiment, the reaction mixture is prepared by dissolving separately the at least one rubber to form a dissolved rubber feed solution and the at least one mPAO to form a dissolved mPAO feed solution, and adding the dissolved at least one mPAO feed solution to the dissolved rubber feed solution and optionally adding a free radical initiator to form the reaction mixture.

In another embodiment, the reaction mixture is prepared by dissolving the at least one rubber to form a dissolved rubber feed solution, adding the at least one mPAO to the dissolved rubber feed solution and dissolving the at least one mPAO in the presence of the dissolved rubber feed, and optionally adding a free radical initiator to form the reaction mixture.

In a further embodiment, the reaction mixture is prepared by dissolving the at least one mPAO to form a dissolved mPAO feed solution, adding the at least one rubber to the dissolved mPAO feed solution and dissolving the at least one rubber in the presence of the dissolved mPAO feed, and optionally adding a free radical initiator to form the reaction mixture.

In another embodiment, the reaction mixture is prepared by dissolving simultaneously the at least one rubber and the at least mPAO to form a dissolved solution containing rubber and mPAO and optionally adding a free radical initiator to form the reaction mixture.

In an embodiment, the reaction mixture further comprises at least one additive selected from a plasticizer, a flame retardant, a filler, and a polymer different from monovinylaromatic polymer and the at least one mPAO. Preferably, the reaction mixture comprises at least one additive being a plasticizer and preferably being mineral oil and/or polyisobutene. Said additives are dissolved separately or together with the at least one rubber and/or with the at least one mPAO.

In an embodiment, the first reaction mixture comprises diluents such as ethylbenzene, toluene, xylene or a combination thereof. In the first reaction mixture, the rubber is dissolved in one or more monovinyl aromatic monomer, preferably being styrene.

Preferably, before the post-inversion polymerization, the polymerization reaction takes place in two or more serially connected reactors.

The phase inversion phenomenon is well-known to the man skilled in the art and is here below explained with the monovinyl aromatic monomer being styrene. The first reaction mixture is polymerized under pre-inversion conditions wherein the continuous phase is a rubber-styrene solution and the discontinuous phase is styrene-polystyrene. As the reaction of styrene into polystyrene progresses and the amount of polystyrene increases, phase inversion occurs, after which the polystyrene/styrene mixture forms the continuous phase with rubber particles dispersed therein. This polymerization reaction can be held in one reactor as in step a) or in at least two reactors as in steps a1) and a2) when performed in at least two stages.

The adjustment of the rubber particle size is being done through process parameter adjustments (solid content, peroxide, temperature, diluent content . . . ) mainly in this particular reactor as well as in the one upstream of it, if any. The adjustments parameters are well known to the man skilled in the art.

Typical free radical initiators include azo compounds and peroxides. Exemplary peroxides include tert-butyiperoxybenzoate, tert-butylperoxyacetate, di-tert-butylperoxide, dibenzoylperoxide, dilauroylperoxide, 1,1-bis-tert-butylperoxycyclohexane, 1,1,-bis-tert-butylperoxy-3,3,5-trimethylcyclohexane and dicumylperoxide.

The at least one pre-inversion reactor and the phase-inversion reactor can be individually selected from a plug-flow reactor (PFR) arranged vertically, a plug-flow reactor (PFR) arranged horizontally and a continuous stirred tank reactor (CSTR). In an embodiment, at least one of the pre-inversion reactor and the phase-inversion reactor are provided with agitators.

In an embodiment, the at least one pre-inversion reactor is operated at temperatures of at least 110° C., preferably from 115° C. to 150° C., more preferably from 120° C. to 140° C., and most preferably from 125° C. to 135° C.

Wth preference in step b) the first polymerization mixture is fed to a polymerization reactor which is plug-flow reactor (PFR).

In an embodiment, the rubber-modified monovinylaromatic polymer leaving the final polymerization or post-polymerisation reactor is sent to a devolatilizer to remove volatile components prior to an extrusion step. The devolatilizer can include a preheater.

Thus, preferably the process further comprises the following steps:

d) a devolatilizing step comprising feeding the mixed polymerization mixture to one or more devolatilizer to remove volatile components and crosslink the rubber, and e) optionally an extrusion step.

If the composition comprises additives such as mineral oil, the same can be added to the reaction mixture or at any point in the polymerization process up and including to the final polymerization reactor, as it is well-known to the man skilled in the art.

The process includes the control of the particle size of the rubber particles, wherein said control include the determination of the solid content in the phase inversion reactor in accordance according to methods well-known in the art.

Alternatively, the mPAO component can be provided into the monovinylaromatic polymer resin by any of the generally well known mixing techniques as used for other additives.

Articles

The articles of the invention (i.e. made from the composition of the invention) are selected from films, fibres, sheet structures, moulded objects (such as appliance and automobile parts), hoses, refrigerator and other liners, clothing and footwear components, gaskets and the like. The articles are made by any forming and/or shaping process, i.e. extrusion, casting, injection moulding, blow moulding, thermoforming, etc.

The present invention can be further illustrated by the following examples, although it will be understood that these examples are included merely for purposes of illustration and are not intended to limit the scope of the invention unless otherwise specifically indicated.

Examples

Test Methods

Kinematic Viscosity at 100° C. (in mm²/s) was determined according to ISO 3104

Kinematic Viscosity at 40° C. (in mm²/s) was determined according to ISO 3104

It is noted that ISO 3104 corresponds to ASTM D445-03.

Viscosity index was determined according to ISO 2909

Flash Point COC (in ° C.) was determined according to ISO 2592

Pour Point (in ° C.) was determined according to ISO 3016

The melt flow rate of the composition was measured according to ISO 1133. For polystyrene the melt flow rate (MI5) was measured according to ISO 1133 conditions H at 200° C. under a load of 5 kg.

Molecular weight: The molecular weight may be measured using gel permeation chromatography. Different solvents can be used, a typical solvent is tetrahydrofuran. Polystyrene standards may be used for calibration.

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The Mw, Mz and Mn are typically determined by gel permeation chromatography using narrow polystyrene standards for calibration.

D50 (v) μm: The volume median diameter of the rubber particle was measured by laser light scattering using the particle size analyser HORIBA 920 from Horiba Scientific. The samples were suspended in methyl ethyl ketone at a concentration of about 1 wt %. Particle size was confirmed by scanning electron microscopy (SEM).

Notched Izod impact strength was measured at 23° C. according to ISO 180.

Vicat Softening temperature B50 is measured according to ISO 306 at a heating rate of 50° C./hour and under a load of 50 N.

The Dow Bar test is used for determination of the environmental stress resistance of test specimens shaped as ISO 527 1A when subjected to a fixed flexural strain of 1.36% in the presence of commercial olive oil (Puget). The result is the ratio of elongation at break between the stressed specimen and its initial elongation at break (e.g. normalized elongation at break). Typical stress durations are 1, 2, 3, 4 and 7 days.

3 Points Bending Test (3PBT): Test specimens equivalents to the central part of the test specimen ISO 3167 1A are subjected to a constant stress in the presence of isopropyl palmitate in a three point bending system. The test is repeated at various stresses. The result is the time of failure.

Amount of PBu in the Final Resin is Obtained by 1H NMR 100 mg of sample is weighted in a small bottle. 1 ml $CDCL_3$ and 1 drop of TMS (tetramethylsilane) were added in the bottle. The sample was shaken at room temperature (about 22° C.) until the solution was homogeneous. When homogeneous, the solution was transferred to a 5 mm NMR sample tube.

$^1$H standard NMR spectrum was recorded with 32 scans and a ninety degree pulse on a Bruker 400 MHz.

Time domain is 32 k.
Sweep width: 15 ppm centered at 5.5 ppm
Interscan delay: 10 s
Rotation speed: 20 Hz
Temperature: 25° C.

Exponential multiplication with a small line broadening factor (LB=0.3) could be applied before Fourier transform was performed. The spectrum was phased and a linear baseline correction is applied between 11 and −1 ppm.

TMS signal is assigned to 0 ppm.

Signals were integrated and normalized areas for each species were calculated from integrated areas. Composition was normalized to 100%.

PBu content in the resin is determined as follows:

(wt %) $PBu$=100*54*$PBu$ area/(104*$PS$ area+7*
(Aliphatic area−3*$PS$ area−4*$PBu$ area)+
54*$PBu$ area)

With: PBu area=Area (6 ppm−4 ppm)/2
PS area=Area (9 ppm−6 ppm)/5
Aliphatic area=Area (4 ppm−0.2 ppm)
Aliphatic area=4−0.2ppm
Amount of Mineral Oil, mPAO, PIB:
The content of Mineral Oil (MO), mPAO and PIB (wt %) in the resin can be determined as follows:

$[MO]f$=([MO]$i$*100)/($SC$)

$[mPAO]f$=([mPAO]$i$*100)/($SC$)

$[PIB]f$=([PIB]$i$*100)/($SC$)

where:
[X]i is the amount of X introduced in the recipe in wt % (X being MO, mPAO, or PIB)
[X]f is the content of X in the final resin in wt % (X being MO, mPAO or PIB)
SC is the final solid content (in wt %) is calculated as follows:

$SC$=([PBu]$i$/[PBu]$f$)*100)

where:
[PBu]i is the amount of PBu introduced in the recipe in wt %
[PBu]f is the content of PBu in the final resin in wt %, as determined by NMR.

The following non-limiting examples illustrate the invention.

Examples:

mPAO properties were compared to PIB properties in Table 1. mPAO1, mPAO2 and mPAO3 correspond respectively to the grades Durasyn® 180R, Durasyn® 180I and Durasyn® 174I commercially available from INEOS Oligomers. They are high viscosity polyalphaolefin, fully synthesized and hydrogenated hydrocarbon base fluid from C10 linear alphaolefin feed stocks. The PIB was PIB H100 from Ineos.

mPAO1 and mPAO3 are comparative mPAO, whereas mPAO2 is a mPAO in accordance with the invention.

TABLE 1

| | mPAO and PIB properties | | | |
|---|---|---|---|---|
| | mPAO1 (Durasyn® 180R) | mPAO2 (Durasyn® 180I) | mPAO3 (Durasyn® 174I) | PIB (H100) |
| K Visc. mm²/s, 100° C. | 98 | 135 | 50 | 220 |
| K Visc. mm²/s, 40° C. | 927 | 1250 | 411 | — |
| Viscosity index | 197 | 216 | 186 | — |
| Flash point COC (° C.) | 290 | 304 | 286 | 170 |
| Mw (Da) | 2300 | 2700 | 1720 | — |
| Pour Point (° C.) | −40 | −37 | −47 | — |

Polymerizations were carried out on bench reactor according to the following recipe: 6.2 wt % PBu, 1.1 wt % mineral oil, 0 or 1 wt % PIB. After the production of 3 kg of each reference resin (C0 and C1), respectively 0.4 wt % and 1.2 wt % of the mPAO1, mPAO2 or mPAO3 were added over the dissolver section in substitution of PIB. Another polymerization was conducted substituting PIB with 2.5 wt % mPAO2. Other polymerization conditions were kept unchanged. Detailed polymerization conditions and products properties are showed in Table 2.

TABLE 2

| | | | | | | | | | |
|---|---|---|---|---|---|---|---|---|---|
| polymerization conditions and product recipe | | | | | | | | | |
| | C0 No PIB No mPAO | C1 PIB H100 | C2 mPAO1 | C3 mPAO1 | C4 mPAO2 | C5 mPAO2 | C6 mPAO2 | C7 mPAO3 | C8 mPAO3 |
| Styrene wt % | 82.3 | 81.5 | 81.5 | 81.5 | 81.5 | 82.3 | 80 | 81.5 | 82.3 |
| Ethylbenz. wt % | 10 | 10 | 10 | 10 | 10 | 10 | 10 | 10 | 10 |
| Rubber conc wt % | 6.2 | 6.2 | 6.2 | 6.2 | 6.2 | 6.2 | 6.2 | 6.2 | 6.2 |
| PIB or mPAO wt % | 0 | 1.2 | 1.2 | 0.4 | 1.2 | 0.4 | 2.5 | 1.2 | 0.4 |
| Min Oil conc wt % | 1.1 | 1.1 | 1.1 | 1.1 | 1.1 | 1.1 | 1.1 | 1.1 | 1.1 |
| Mercaptan conc -ppm | NDM 250 | NDM 250 | NDM 250 | NDM 250 | NDM 250 | NDM 250 | NDM 250 | NDM 250 | NDM 250 |
| Peroxide Conc -ppm | 225 | 225 | 225 | 225 | 225 | 225 | 225 | 225 | 225 |

The peroxide used was Luperox 331 in all experiments. The rubber used was Buna CB550T from Lanxess. Buna CB550T is a low-cis medium viscosity Lithium butadiene rubber with a solution viscosity of 163 mPa.s as determined in 5.43% toluene in accordance with ISO 3105.

The mineral oil used was Fina Vestan (kinematic viscosity at 40° C. of 68 mm$^2$/s according to IS03104).

Compositions C4, C5 and C6 are inventive compositions according to the invention. Other compositions are comparatives.

The properties of the compositions are given in Table 3

TABLE 3

| | | | | | | | | | |
|---|---|---|---|---|---|---|---|---|---|
| Properties of the composition | | | | | | | | | |
| Properties | C0 no PIB no mPAO | C1 PIB H100 | C2 mPAO1 | C3 mPAO1 | C4 mPAO2 | C5 mPAO2 | C6 mPAO2 | C7 mPAO3 | C8 mPAO3 |
| PBu content (wt %) | 8 | 7.9 | 7.1 | 7 | 7.4 | 8 | 7.9 | 7.3 | 7.6 |
| Solid content (wt %) | 77.5 | 78.5 | 87.3 | 88.6 | 83.8 | 77.5 | 78.5 | 84.9 | 81.6 |
| Min Oil content (wt %) | 1.4 | 1.4 | 1.3 | 1.2 | 1.3 | 1.4 | 1.4 | 1.3 | 1.3 |
| PIB content (wt %) | 0 | 1.5 | 0 | 0 | 0 | 0 | 0 | 0 | 0 |
| mPAO content (wt %) | 0 | 0 | 1.4 | 0.5 | 1.4 | 0.5 | 3.2 | 1.4 | 0.5 |
| MI5 (g/10') | 3.5 | 4.6 | 4.7 | 4.7 | 4.5 | 4.1 | 3.1 | 4.1 | 4.1 |
| Mw (kDa) | 168 | 160 | 164 | 156 | 156 | 155 | 161 | 153 | 154 |
| Mn (kDa) | 71 | 76 | 71 | 68 | 66 | 62 | 61 | 61 | 61 |
| Mz (kDa) | 289 | 268 | 277 | 269 | 268 | 275 | 281 | 271 | 273 |
| Mw/Mn | 2.4 | 2.1 | 2.3 | 2.3 | 2.4 | 2.5 | 2.6 | 2.5 | 2.5 |
| D50(v) μm | 3.6 | 5.1 | 4.4 | 5.5 | 6.2 | 6.0 | 3.9 | 5.4 | 6.0 |
| Izod V-Notch 23° C. (J/m$^2$) | nd | 12.3 | 11.4 | 11.0 | 9.9 | 11.7 | nd | 11.4 | 10.9 |
| Vicat B50 (° C.) | 90 | 88.6 | 89.5 | 90.8 | 89.9 | 90.3 | 87.6 | 89.6 | 90.3 |

Product stress crack performances were analysed via Dow Bar and 3PBT tests. Results are detailed in Table 4 and FIG. 1.

Dow bar tests show improved elongation at break for HIPS containing 3.3 wt %, 1.6 wt % and 0.5 wt % of mPAO2 at 7 days. Lower viscosity mPAO1 and mPAO3 are not improving elongation properties compared to PIB at 7 days. This result is surprising as improvement of the elongation properties is observed at concentrations of mPAO as low as 0.5 wt %.

The improved stress crack properties of HIPS containing 1.6 wt % high viscosity mPAO2 (Durasyn 1801) is confirmed via the 3PBT test (for stress crack evaluation) as depicted in FIG. 1.

TABLE 4

Dow bar results on injected samples.

| Elongation at Break % | Contact time | C0 No PIB No mPAO | C1 PIB | C2 mPAO1 | C3 mPAO1 | C4 mPAO2 | C5 mPAO2 | C6 mPAO2 | C7 mPAO3 | C8 mPAO3 |
|---|---|---|---|---|---|---|---|---|---|---|
| Sample as such | | 35.2 | 42.7 | 36.0 | 34.7 | 36.9 | 42.5 | 38.5 | 36.6 | 35.3 |
| Sample with cracking agent | 15 min | 37.8 | 44.4 | 37.8 | 33.2 | 38.0 | 38.1 | 36.9 | 39.3 | 34.8 |
| | 1 day | 30.4 | 36.6 | 32.0 | 31.0 | 40.8 | 31.8 | 39.0 | 38.7 | 30.2 |
| | 2 days | 23.5 | 23.3 | 11.7 | 10.8 | 28.5 | 14.9 | 43.6 | 11.8 | 27.2 |
| | 3 days | 6.7 | 13.2 | 9.7 | 9.3 | 11.2 | 12.8 | 39.7 | 5.5 | 4.6 |
| | 4 days | 5.4 | 13.3 | 5.9 | 9.5 | 6.9 | 10.0 | 37.5 | 5.8 | 5.3 |
| | 7 days | 5.1 | 3.6 | 3.2 | 2.9 | 7.1 | 6.8 | 12.6 | 3.0 | 3.2 |

The invention claimed is:

1. A process for preparing a rubber-modified monovinylaromatic polymer composition comprising the step of polymerizing a reaction mixture of monovinylaromatic monomer, one or more rubber and one or more metallocene-catalyzed poly-alpha olefins (mPAO), wherein the one or more mPAO is present in an amount of from 0.1 to 3.4 wt % based on the total weight of the mixture, wherein the improved rubber-modified monovinylaromatic polymer composition comprises:
    70 wt % or more of a monovinylaromatic polymer matrix, based on the total weight of the rubber-modified monovinylaromatic polymer,
    from 2 to 12 wt % of at least one rubber, based on the total weight of the rubber-modified monovinylaromatic polymer, and
    from 0.1 to 3.4 wt % of metallocene-catalyzed poly-alpha-olefins (mPAO) based on the total weight of the rubber-modified monovinylaromatic polymer, with the mPAO having a kinematic viscosity of at least 950 mm$^2$/s at 40° C. and at most 2,000 mm$^2$/s at 40° C. as measured according to ISO 3104, wherein the reaction mixture is prepared by:
    a) feeding a reaction mixture comprising at least one monovinyl aromatic monomer, at least one rubber, at least one mPAO having a kinematic viscosity of at least 950 mm$^2$/s at 40° C. and at most 2,000 mm$^2$/s at 40° C. as measured according to ISO 3104, and a free radical initiator to a phase-inversion reactor and polymerizing the reaction mixture in the phase-inversion reactor to above the inversion point of the reaction mixture to produce a first polymerization mixture comprising at least the rubber and the mPAO;
    b) feeding the first polymerization mixture to a polymerization reactor to produce a second polymerization mixture;
    c) optionally feeding the second polymerization mixture into at least one subsequent reactor for post-inversion polymerization of the third polymerization mixture.

2. The process according to claim 1 wherein a) is performed in two or more stages comprising
    a1) feeding a reaction mixture comprising at least one monovinyl aromatic monomer, at least one rubber, at least one mPAO and free radical initiator to a pre-inversion reactor, and polymerizing the reaction mixture in the reactor to a point below the inversion point of the reaction mixture to produce a pre-polymerization mixture;
    a2) feeding the pre-polymerization mixture to a phase-inversion reactor and polymerizing the pre-polymerization mixture to above the inversion point of the pre-polymerization mixture to produce a first polymerization mixture.

3. The process according to claim 1 wherein the mPAO is present in an amount of at least 0.3 wt % based on the total weight of the rubber-modified monovinylaromatic polymer; and/or the mPAO is present in an amount of at most 3.0 wt % based on the total weight of the rubber-modified monovinylaromatic polymer.

4. The process according to claim 1 wherein the kinematic viscosity of the mPAO is at least 1,000 mm$^2$/s at 40° C. as measured according to ISO 3104; and/or the kinematic viscosity of the mPAO is at most 1,800 mm$^2$/s at 40° C. as measured according to ISO 3104.

5. The process according to claim 1 wherein the kinematic viscosity of the mPAO is at least 100 mm$^2$/s at 100° C., as measured according to ISO 3104.

6. The process according to claim 1 wherein the viscosity index of the mPAO is at least 200 as determined according to ISO 2909.

7. The process according to claim 1 wherein the mPAO has a pour point of less than −30° C. as determined by ISO 3016.

8. The process according to claim 1 wherein the rubber-modified monovinylaromatic polymer composition further comprises a plasticizer in amounts ranging from 0.1 to 6 wt % of the composition.

9. The process according to claim 8 wherein the weight ratio of the plasticizer to the mPAO in the composition is at most 1:50.

10. The process according to claim 1 wherein the rubber-modified monovinylaromatic polymer is a rubber-modified polystyrene (HIPS) or a rubber-modified poly(styrene-acrylonitrile) (ABS).

11. The process according to claim 1 wherein the rubber is selected from the group consisting of polybutadiene, polyisoprene, copolymers of butadiene and/or isoprene with styrene, and natural rubber.

12. The process according to claim 1 wherein the weight average molecular weight (Mw) of the monovinylaromatic polymer matrix is at least 130,000 g/mol, and the molecular weight distribution of the monovinylaromatic polymer matrix is at least 1.8.

* * * * *